Figure 1:
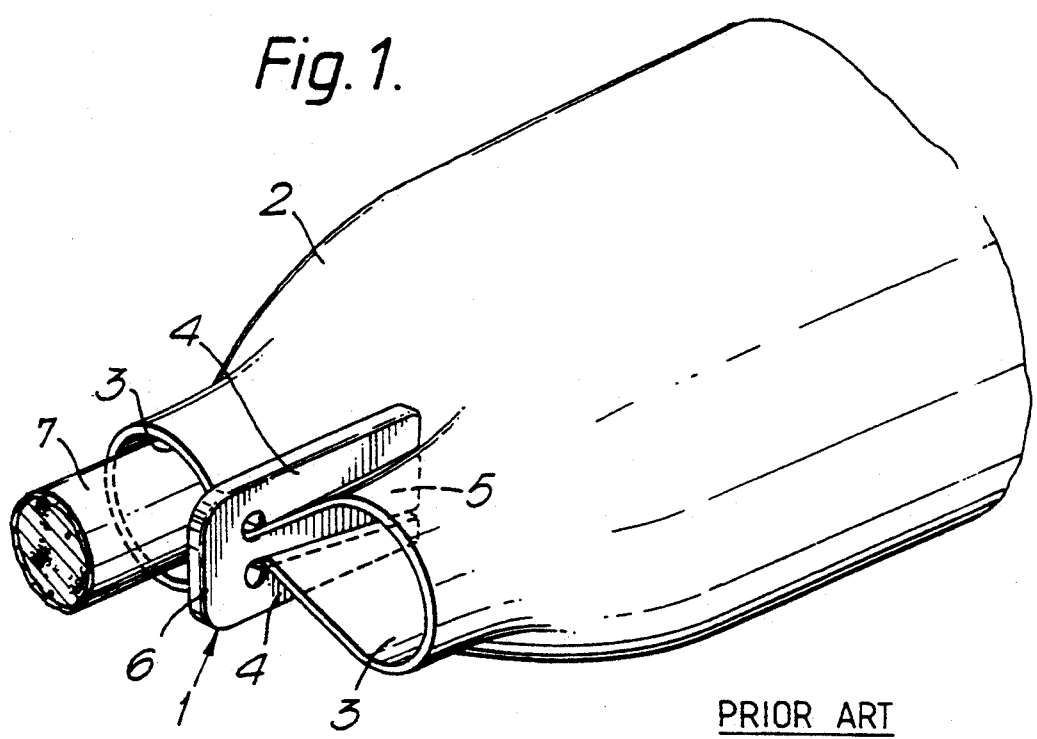

United States Patent [19]
Wambeke et al.

[11] Patent Number: 5,271,782
[45] Date of Patent: Dec. 21, 1993

[54] ENVIRONMENTAL SEALING

[75] Inventors: Alain Wambeke, Zoutleeuw; Jean-Marie E. Nolf, Korbeek-Lo, both of Belgium; Michael R. Read, Los Altos, Calif.

[73] Assignee: N.V. Raychem S.A., Kessel-lo, Belgium

[21] Appl. No.: 777,250

[22] PCT Filed: Mar. 25, 1990

[86] PCT No.: PCT/GB90/00825
§ 371 Date: Nov. 26, 1991
§ 102(e) Date: Nov. 26, 1991

[87] PCT Pub. No.: WO90/14213
PCT Pub. Date: Nov. 29, 1990

[30] Foreign Application Priority Data

May 26, 1989 [GB] United Kingdom ............ 8912143

[51] Int. Cl.$^5$ ............................................. B32B 31/26
[52] U.S. Cl. ............................................. 156/85; 156/86
[58] Field of Search ............ 156/85, 86; 174/DIG. 8

[56] References Cited

U.S. PATENT DOCUMENTS 4,298,415 11/1981 Nolf ................................. 156/85

FOREIGN PATENT DOCUMENTS

| 0110705 | 6/1984 | European Pat. Off. | 15/18 |
| 0120603 | 10/1984 | European Pat. Off. | 4/70 |
| 0127457 | 12/1984 | European Pat. Off. | |
| 8424167 | 1/1986 | Fed. Rep. of Germany | 1/14 |
| 3430088 | 2/1986 | Fed. Rep. of Germany | 1/14 |
| 2500223 | 8/1982 | France | 15/19 |
| 1594818 | 8/1981 | United Kingdom | 15/11 |
| 1604986 | 12/1981 | United Kingdom | 2/20 |

Primary Examiner—Caleb Weston
Attorney, Agent, or Firm—A. Stephen Zavell; Herbert G. Burkard

[57] ABSTRACT

A method of forming a branch-off seal between a heat-shrinkable sleeve and at least two substrates, which comprises the steps of: (a) positioning the substrates within the heat-shrinkable sleeve; (b) forming at least two heat-shrinkable terminal conduits by positioning a clip having at least three elongate legs over the outer surface of the heat-shrinkable sleeve at an open end thereof, wherein at least two of said legs are positioned externally of the sleeve, the substrates are within the terminal conduits and at least one of said legs is positioned internally of the sleeve, and (c) while the clip remains on the outer surface of the heat-shrinkable sleeve, applying heat so as to effect shrinkage of the sleeve and to form the desired seal; in which the leg positioned internally has a coating of heat-softenable sealing material that extends beyond its distal end, the extension being such that at least a portion of extending material does not flow significantly during step (c).

25 Claims, 3 Drawing Sheets

ENVIRONMENTAL SEALING

The present invention relates to a method and article for environmental sealing, particularly of a cable splice, especially a telecommunications cable splice.

Where two or more cables are spliced together, portions of cable jacket will have been removed in order to gain access to the conductors of each cable that are to be electrically (or, in the case of optical cables, optically) connected together. It will then be necessary to make good the area bare of cable jacket if moisture, dirt, insects or other environmental agency is not to impair working of the cable. This making good is generally done by building a so-called splice case around the cable splice, often by first installing a liner which offers mechanical protection and then dimensionally-recovering a dimensionally-recoverable sleeve around the liner. The recovered, generally heat-shrunk, sleeve engages the cables either side of the splice thereby forming a sealed enclosure.

The sleeve may be internally coated with a heat-activatable sealing material, particularly a hot-melt adhesive, and a single heating step may then cause heat-shrinkage of the sleeve and activation of the sealing material, thereby forming a bond to the cables.

In many instances, for example where room for installation of a sleeve is restricted, or where ends of the cables are inaccessible (e.g. where a cable splice is being repaired or modified and some conductors remain joined), a simple tubular sleeve may be difficult or impossible to use. For such applications "wrap-around sleeves" have been developed. They are heat-shrinkable sheets which can be wrapped around a cable splice or other substrate to form a generally tubular shape, and which in general are provided with fastening means for holding them in the wrapped around configuration during heat-shrinkage. In a preferred design such sleeves have ridges (of any suitable shape) at opposing longitudinal edge portions over which a channel, C-shaped in transferse cross-section, can be installed. Reference may be made to GB1155470 and EP0116392, both Raychem.

Heat-shrinkable sleeves have been successfully employed in many fields, but problems may arise when two or more substrates (such as cables, pipes or other supply lines) have to be sealed at one position. This problem, which is known as "branch-off" or "branch-out" may occur where one cable is spliced into an intermediate portion of another cable, or where three or more cables are spliced together. In particular it may occur at an end of heat-shrinkable sleeve in the production of a cable splice case.

A solution to this problem is disclosed in GB1604986 (Raychem) in which a clip is used to form at least two conduits at the end of a heat-shrinkable sleeve by positioning the clip over the end of the sleeve to bring together between the cables circumferentially-spaced portions of the sleeve.

The clip of GB1604986 comprises two or more outer elongate legs and at least one inner elongate leg, at least Dart of the surface of the inner leg being provided with a heat-activatable adhesive or sealant thereon, the legs being so arranged that the clip can be positioned on the open end of a heat-shrinkable sleeve, with the outer legs outside the sleeve and the inner leg inside the sleeve, so as to form at least two terminal conduits capable of receiving elongate substrates.

The clips disclosed in GB1604986 perform excellently and have been widely used throughout the world. Nonetheless, proposals have been made to reduce the likelihood of substrate damage in unfavourable conditions due for example to unskilled hands applying to much heat and perhaps causing an over-hot inner leg to be forced against the substrates.

To solve that potential problem, it was proposed in EP0110705 (Raychem) that a clip should be used that comprises at least two outer legs and an inner leg so arranged that the clip can be positioned over the outer surface of a recoverable sleeve at an end thereof with the outer legs outside the sleeve and the inner legs inside the sleeve; the inner leg comprising a heat-activatable sealing material and a heat-conductive member or region thermally connecting the outer legs with the sealing material, characterized in that the dimensional integrity of at least part of the member or region weakens on heating at or shortly after activation of the sealing material, thus reducing the thermal connection, or reducing the rigidity of at least a portion of the inner leg, or both.

A further design of branch-off clip is disclosed in EP0120603 (Raychem). Here a clip has at least two outer legs and one inner leg which has an aspect ratio of at least 4:1. The clip is for sealing around an armoured telecommunications cable, where a seal has to be made to an internal jacket and a mechanical bond made to external armouring. As a result of these two requirements sealing materials of different characteristics may be applied to different parts of the assembly of sleeve plus clip, for example to the distal and proximal parts of the inner leg of the clip. The adhesive at the proximal part of the leg may experience a higher temperature and be required to produce a stronger bond than that at the distal part of the leg.

EP0127457 (Raychem) discloses an electrically-heat-recoverable sleeve and a clip which can be positioned at an end of the sleeve so as to form at least two terminal conduits therein, the clip comprising an inner leg of a heat-activatable sealing material and two outer legs. Lack of a central conducting member in the inner leg can reduce the likelihood of cable damage during installation. A clip is disclosed whose inner leg comprises two different materials end-to-end. The material near the bridge portion of the clip (i.e. the part at least notionally joining the legs) may act as a dam. Alternatively the material near the bridge may flow to produce a seal at the end of the sleeve but after installation become rigid, whilst the material at the distal end of the inner leg retains some flexibility and acts to block any leak paths between the rigid material and the cables or sleeve. Reference may also be made to FR2500223 (W. Rose) and to GB1594818 (Raychem).

The disclosures of each of the above prior art patent specifications is incorporated herein by reference.

We have now designed an improved clip, and consequent method of forming a branch-off seal, which can further reduce the likelihood of cable damage and improve performance of the sealed product. The invention allows the use of a clip under more severe installation and service conditions, and in particular allows the ready use of sleeves of very high shrinkage force, and allows good seals to be made around large and heavy cables. The invention achieves this by retaining extra adhesive where it is required, by reducing its displacement by the shrinking sleeve. Also the invention allows a clip to be designed that can be easily installed, but still has sufficient adhesive to do the job. In the past it has been thought that the requirements of a good seal (much adhesive) and ease of installation (less adhesive, allowing a greater gap between the legs for the sleeve) were in conflict. We have now found a way of resolving this conflict.

Thus the invention provides a method of forming a branch-off seal between a heat-shrinkable sleeve and at least two substrats, which comprises the steps of:
(a) positioning the substrates within the heat-shrinkable sleeve;
(b) forming at least two heat-shrinkable terminal conduits by positioning a clip having at least three elongate legs over the outer surface of the heat-shrinkable sleeve at an open end thereof, wherein at least two of said legs are positioned externally of the sleeve, the substates are within the terminal conduits and at least one of the said legs is positioned internally of the sleeve; and
(c) while the clip remains on the outer surface of the heat-shrinkable sleeve, applying heat (for example by means of an open flame or hot-air directed against the outside of the sleeve, or by electrical self-heating) so as to effect shrinkage of the sleeve and to form the desired seal;
in which the leg positioned internally has a coating of heat-softenable sealing material that extends beyond its distal end, the extension being such that at least a portion of extending material does not flow significantly during step (c).

The invention also provides a clip as defined above.

The extension is preferably from 1-5 cm, more preferably from 1.3-5 cm, especially from 1.5-3 cm. The extension is preferably from 10-50%, more preferably 15-25% expecially 15-20% of the total length of sealing material along the direction of the leg positioned internally. In terms of relative volumes, we prefer that the volume of the extension is from 10-60%, more preferably 20-50% especially 30-50%, more especially 40-50%, of the total volume of the sealing material.

The sealing material is preferably a hot-melt adhesive, particularly a polyamide based adhesive. We prefer that it has a viscosity of 40-110 pa.s, more preferably 50-80 pa.s at 100° C. Its softening point is preferably from 70°-120° C., more preferably from 80°-110° C. In general the sealing material of the extension will experience a temperature about 15-30 centigrade degrees below that which surrounds the central leg and which therefore receives heat by conduction from the heating means (open flame torch etc. directed against the outside of the sleeve) via the outer legs through a bridge part of the clip down into the inner leg. Preferably this lower temperature is at most 70° C.

One preferred sealing material comprises a blend of:
(a) polyamide;
(b) copolymer of ethylene and an ester of an ethylenically unsaturated carboxylic acid, said copolymer having a melt flow index of at least 40 as measured according to ASTM D1238-70; the amount of copolymer being at least 38% based on the weight of the polyamide; and
(c) optionally a polyethylene acrylic acid copolymer.

We prefer that the sealing material is of substantially uniform composition along the direction of the leg positioned internally. This need not, however, be so and for example the sealing material may have a higher softening point and/or higher melt viscosity at a position nearer its distal end than at a position nearer its proximal end. The portion with the higher softening point and/or melt viscosity may be the extension or it may be more than the extension or it may be a part only of the extension.

The leg positioned internally preferably has a length substantially equal to or greater than the length of each of the legs positioned externally. Also, or alternatively, the sealing material preferably extends substantially to or beyond a straight line joining the distal ends of said two legs positioned externally.

The legs of the clip preferably lie substantially in one plane, and at least the outer legs (i.e. the legs positioned externally) are preferably significantly wider (their dimension in that plane) than they are thick (one of their dimensions perpendicular to that plane). The sealing material is preferably tapered at its distal end towards its distal end and preferably in the plane of the three legs.

We further pefer that each outer leg is thinner in the plane of the three legs at an intermediate portion along its length than at portions either end of said intermediate portion. This may result from each of those legs having a ridge running around its perimeter (preferably on each surface), the ridge being interrupted at said intermediate portion.

This portion of reduced thickness can help reduce the likelihood of a leak path being formed along the length of the clip between the inner leg (i.e. the leg positioned internally) and the outer legs. Such leak paths may otherwise result from sealing material being squeezed away due to the cable being forced against the edge of the clip. The sleeve is not however able to follow precisely the change of leg thickness, and some sealing material remains. Also, benefit results from the absolute reduction in thickness and we prefer a thickness of the thinner portion of 4 mm or less, especially 3 mm or less.

A further feature that may be provided is a separating means, for example a block of rubber or other preferably resilient, preferably non-flowable material, of low thermal-conductivity positioned to maintain a separation between the substrates. Such a separating means is preferably positioned at each side of a bridge portion of the clip that joins the three legs. The separating means may have an aperture therein, preferably an open groove, through which the sealing material can flow on completion of step (c). The material that has thus flowed will generally be visible on the outside of the formed splice case etc between the cables, and its presence there will be an indication that sufficient heat has been applied.

A further reduction in likelihood of cable damage may be achieved by providing at least one hole in the outer legs. This reduces the amount of heat they are able to pick up from an open flame etc applied to the outside of the sleeve. Also, it may allow for some direct heating (through the holes) of sleeve otherwise hidden by the clip, and thus reduce heating time.

The features disclosed above help to prevent flow of sealing material towards the inside of the splice case, i.e. away from the sleeve end where it is desired. Thus leak paths may be prevented, and sufficient adhesive around the hot inner leg can prevent cable damage.

We prefer that the clip be used with a heat shrinkable sleeve, particularly a wrap-around sleeve, comprising a composite material having fibres. The fibres may provide reinforcement to some matrix material, for example improving tear resistance or improving impact strength or hoop strength under internal pressure. Alternatively, or additionally, the composite material may be shrinkable by virtue of a recoverable fibre component thereof, optionally provided as a recoverable fabric. For example the fabric may comprise recoverable polyethylene or other fibres giving the sleeve circumferential shrinkage, and non-shrinkable glass or other strength fibres running longitudinally in the sleeve. The fabric may comprise a weave or a knit etc., laminated or impregnated with a polymeric matrix material. Such composite materials may be very strong and exhibit high shrinkage forces, and may be heated strongly during installation, and as a result benefit from the use of the clip of the present invention. Such a material is disclosed in EP0116393 (Raychem) the disclosure of which is incorporated herein by reference.

The invention is preferably used in the environmental protection of cables, particularly telecommunications cables for pressurized or unpressurized cables. Such cable splices may additionally employ a liner for splice protection.

Figure 3:
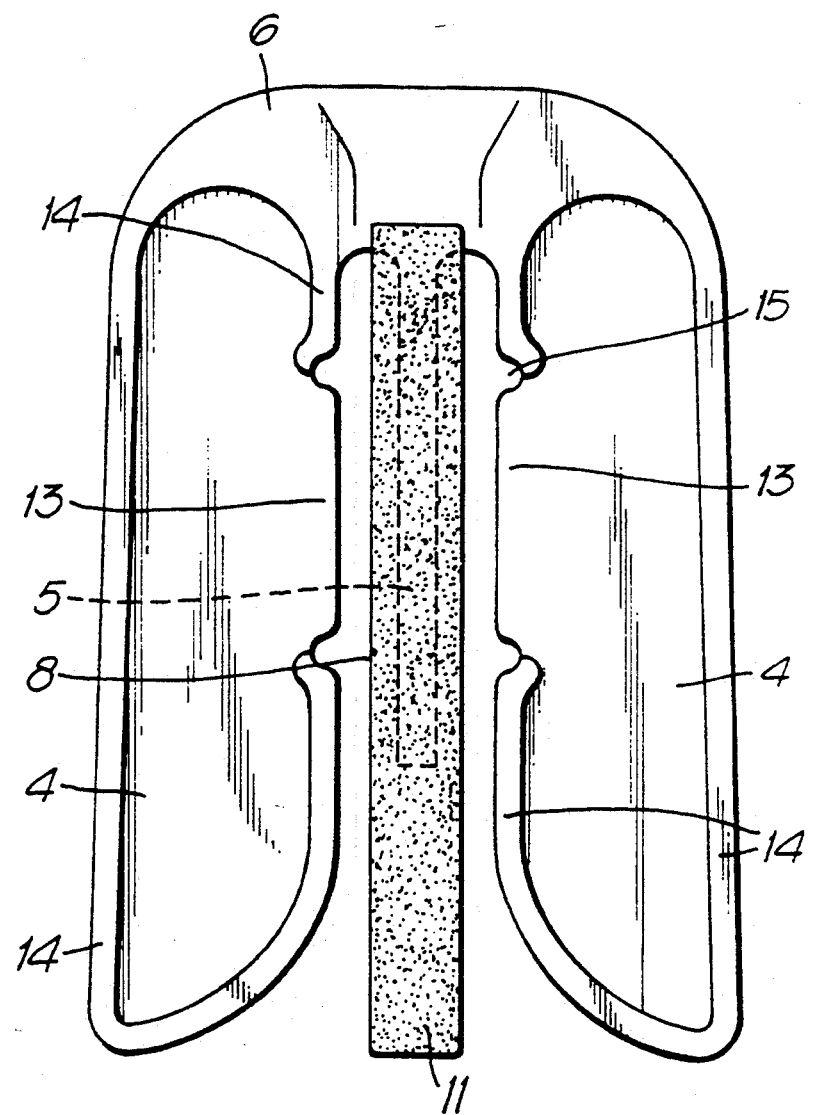
Figure 4:
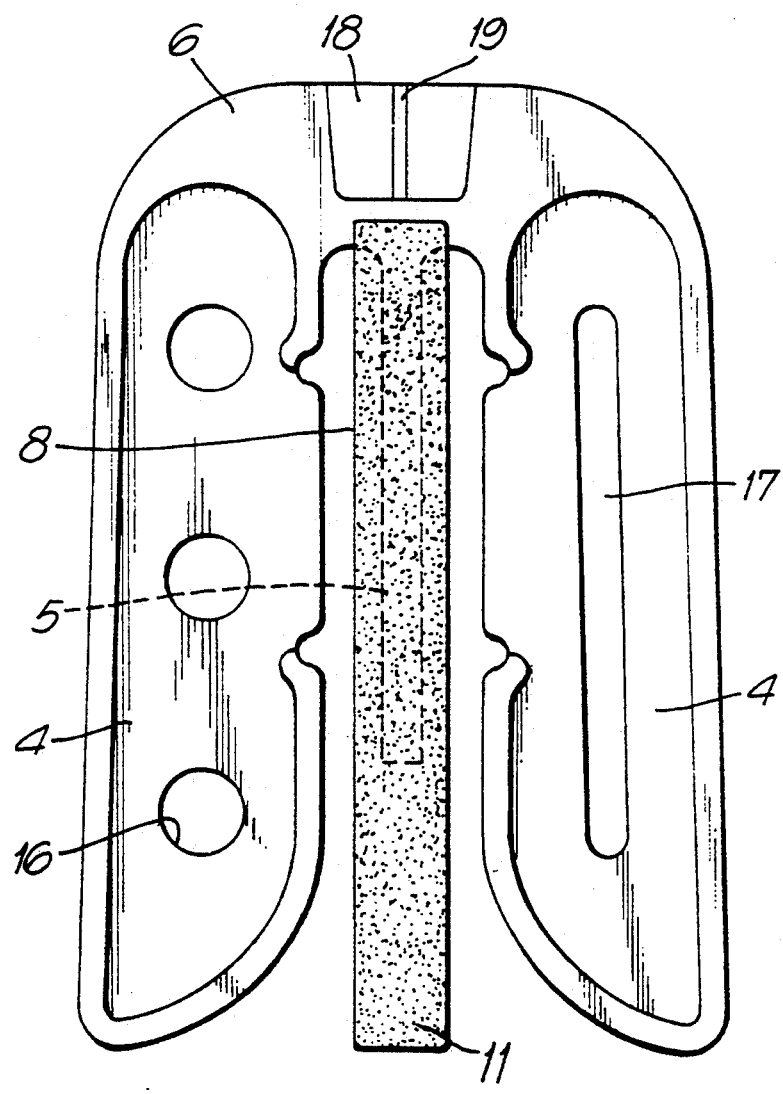

The invention is further illustrated by the accompanying drawings, in which: FIG. 1 shows a prior art heat-shrinkable sleeve and branch-off clip for forming a branching cable splice case; and FIGS. 2-4 show clips of the invention.

FIG. 1 shows a prior art clip 1 positioned on an end of a heat-shrinkable sleeve 2 to form two conduits 3 in the end thereof. This is disclosed in GB1604986. The clip 1 has two outer legs 4 positioned outside the sleeve and an inner leg 5 coated with a hot-melt adhesive positioned inside the sleeve. The legs may be regarded as joined at a bridge portion 6 of the clip. A multicore telecommunications cable 7 can be seen in one of the conduits 3, a cable in the other being omitted for clarity. A cable splice between two such cables 7 is being sealed by and within the sleeve 2. On heating the sleeve 2 shrinks down into sealing engagement with the cables 7, and the adhesive on leg 5 melts.

Figure 2:
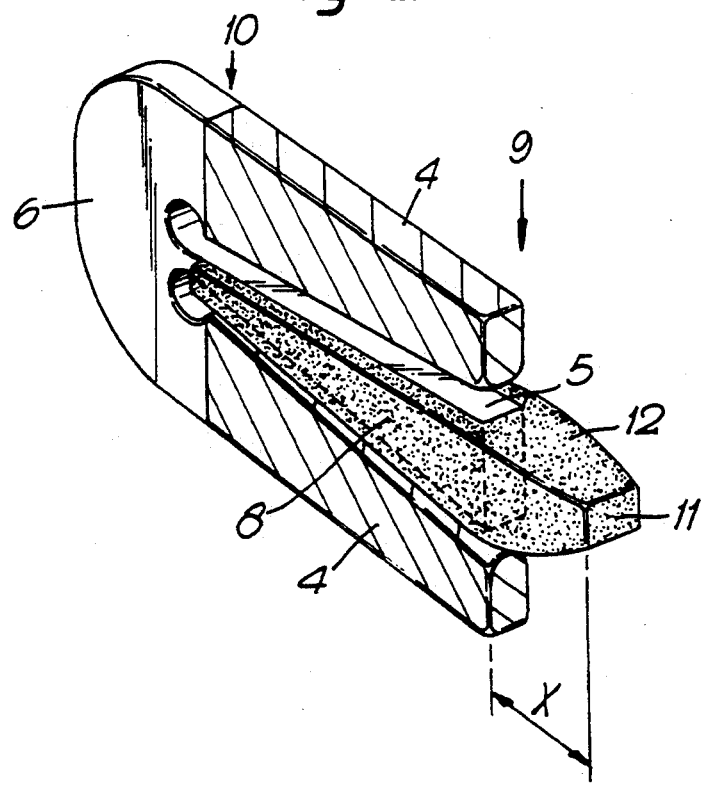

A clip of the invention is shown in FIG. 2. Sealing material 8 on the inner leg 5 can be seen to extend past the distal ends 9 of the legs. The clip preferably comprises a metal or other heat-conducting material. The metal may have a protective coating of an epoxy or other material, which may be omitted from the inner leg. The proximal ends of the legs are of course located as shown at 10, although the precise line where the bridge 6 ends and the legs begin is to a certain extent arbitrary. This is mentioned because reference is made in this specification to lengths of the legs. In practice, however, it is believed that comparison of lengths of the legs will not present a difficulty.

The extension of the sealing material 8 is shown at 11, and it can be seen to be tapered along its length X. Preferably it tapers such that it gets thinner towards its distal end. This taper 12 makes insertion easier of the clip onto the end of a sleeve between cables.

In general, the invention provides a dam during installation reducing flow of sealing material away from the end of the clip. Hitherto much adhesive had to be provided to compensate for this. We are now able to reduce the amount of adhesive allowing a larger initial gap between the legs for the sleeve to be received, but still retaining enough adhesive for a good seal.

The gap between the (coated) inner leg and each outer leg is preferably at least 3 mm, preferably at least 4 mm.

The clip shown in FIG. 3 has outer legs 4 having a thinner portion 13 at an intermediate portion along their lengths. In the illustrated embodiments this results from interrruption of a ridge 14 around the perimeters of the legs 4. The clip shown also has recesses 15, giving the clip what is known as an anti-milk-off profile: when the sleeve between the legs circumferentially shrinks it becomes thicker and gets locked into these recesses 15, preventing the clip slipping off the end of the sleeve.

Several further features are shown in FIG. 4. The outer legs have holes therein, for example round holes 16 or a longitudinally-extending hole or slot 17. A spacing means 18 is also provided, having a slot 19 therein through which sealing material 8 may flow so it becomes visible to the installer, indicating that sufficient heat has been applied.

The invention is particularly useful for sealing large and/or heavy cables where difficulties have been noted in the past for example in producing a splice case that will easily pass say 100 cycles or more of an environmental water cycling test between 5° C. and 60° C. (this being the basis of for example a standard British Telecom test). The invention can overcome these difficulties for example with a 56 mm/56 mm two cable branch-out or a 46 mm/66 mm two cable branch-out. Other configurations are also possible. The new clip is particularly useful with the product known by the Raychem Trade Mark XAGA 1000, for example size 122.

For the avoidance of doubt it is here noted that the invention provides a method and article for making a branch-off seal allowing easy installation of clip and good sealing without cable damage or leak paths. Adhesive quantities may be reduced since less is wasted by undesirable flow. Any of the various features noted herein may be taken individually or in any combination, for example the sealing material extension, its nature, position or shape, clip shape or size, spacing means, and holes in legs may be selected.

We claim:

1. A method of forming a branch-off seal between a heat-shrinkable sleeve and at least two substrates, which comprises the steps of:
    (a) positioning the substrates within the heat-shrinkable sleeve;
    (b) forming at least two heat-shrinkable terminal conduits by positioning a clip having at least three elongate legs over the outer surface of the heat-shrinkable sleeve at an open end thereof, wherein at least two of said legs are positioned externally of the sleeve, the substrates are within the terminal conduits and at least one of said legs is positioned internally of the sleeve, and
    (c) while the clip remains on the outer surface of the heat-shrinkable sleeve, applying heat so as to effect shrinkage of the sleeve and to form the desired seal;
in which the leg positioned internally has a coating of heat-softenable sealing material that extends beyond its distal end, said sealing material extending beyond the portions of the legs positioned externally which holds the sleeve against the leg positioned internally, the extension being such that at least a portion of extending material does not flow significantly during step (c).

2. A method according to claim 1, in which said extension is from 1-5 cms.

3. A method according to claim 1 in which said extension is from 10-50% of the total length of the sealing material along the direction of the leg positioned internally.

4. A method according to claim 1, in which the volume of said extension is from 10-60% of the total volume of the sealing material.

5. A method according to claim 1, in which the sealing material comprises a hot-melt adhesive.

6. A method according to claim 1, in which the sealing material is of substantially uniform composition along the direction of the leg positioned internally.

7. A method according to claim 1, in which the sealing material has a higher softening point and/or higher melt viscosity at a position nearer its distal end than at a position nearer its proximal end.

8. A method according to claim 1, in which the sealing material has a viscosity of from 50-80 Pa.s at 100° C.

9. A method according to claim 1, in which the leg positioned internally has a length substantially equal to or greater than the length of each of the legs positioned externally.

10. A method according to claim 1, in which the sealing material extends substantially to or beyond a straight line joining the distal ends of said two legs positioned externally.

11. A method according to claim 1, in which said three legs lie substantially in one plane.

12. A method according to claim 11, in which the sealing material is tapered at its distal end in the plane of the three legs.

13. A method according to claim 11, in which each leg positioned externally is thinner in the plane of the three legs at an intermediate portion along its length than at portions either end of said intermediate portion.

14. A method according to claim 13, in which each leg positioned externally is substantially planar and has a ridge substantially around its perimeter, the ridge being interrupted at said intermediate portion.

15. A method according to claim 1, in which the clip has a separating means of low thermal-conductivity positioned to maintain a separation between the substrates.

16. A method according to claim 15, in which the separating means is positioned at each side of a bridge portion of the clip that joins the three legs.

17. A method according to claim 16, in which said separating means has an aperture therin through which the sealing material can flow on completion of step (c).

18. A method according to claim 1, in which the leg positioned internally has a metal surface, the sealing material being coated directly onto said metal surface.

19. A method according to claim 1, in which each leg positioned externally has at least one hole through its thickness.

20. A method according to claim 1, in which the substrates comprise cables.

21. A method according to claim 20, in which the cables comprise telecommunications cables.

22. A clip as defined in claim 1.

23. A kit-of-parts which comprises a clip according to claim 22 and a heat-shrinkable sleeve.

24. A kit-of-parts according to claim 23, in which the sleeve comprises a composite material having fibres.

25. A process according to claim 1, wherein the portions of the legs positioned externally diverge from the leg position internally so as to give an increasing gap between the leg positioned internally and the legs positioned externally.

* * * * *

UNITED STATES PATENT AND TRADEMARK OFFICE
CERTIFICATE OF CORRECTION

PATENT NO. : 5,271,782
DATED : December 21, 1993
INVENTOR(S) : Alain Wambeke, et. al.

It is certified that error appears in the above-indentified patent and that said Letters Patent is hereby corrected as shown below:

Column 1, line 62, replace "Dart" by --part--.

Column 7, claim 10, line 2, delete "to or--.

Signed and Sealed this

Twentieth Day of June, 1995

Attest:

BRUCE LEHMAN

Attesting Officer     Commissioner of Patents and Trademarks